United States Patent
Tonshal et al.

(10) Patent No.: US 10,485,037 B2
(45) Date of Patent: Nov. 19, 2019

(54) METHOD AND APPARATUS FOR DISTRIBUTED CONNECTIVITY VEHICLE MANAGEMENT

(71) Applicant: FORD GLOBAL TECHNOLOGIES, LLC, Dearborn, MI (US)

(72) Inventors: Basavaraj Tonshal, Northville, MI (US); Anthony Mark Phillips, Northville, MI (US); Ylldes Zeneli, Bloomfield Hills, MI (US); Florian Frischmuth, Plymouth, MI (US); Julius Marchwicki, Detroit, MI (US); Ritesh Pandya, Rochester Hills, MI (US); Charles J. King, II, Saline, MI (US); Yifan Chen, Ann Arbor, MI (US); Panduranga Kondoju, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 495 days.

(21) Appl. No.: 14/955,669

(22) Filed: Dec. 1, 2015

(65) Prior Publication Data

US 2017/0156167 A1    Jun. 1, 2017

(51) Int. Cl.

| | |
|---|---|
| *H04W 76/14* | (2018.01) |
| *H04W 4/80* | (2018.01) |
| *H04L 29/08* | (2006.01) |
| *H04W 72/08* | (2009.01) |
| *H04W 88/06* | (2009.01) |

(52) U.S. Cl.
CPC ............ *H04W 76/14* (2018.02); *H04L 67/12* (2013.01); *H04L 67/16* (2013.01); *H04W 4/80* (2018.02); *H04W 72/085* (2013.01); *H04W 88/06* (2013.01)

(58) Field of Classification Search
CPC ........ H04L 67/12; H04L 67/16; H04W 4/008; H04W 72/085; H04W 76/023; H04W 88/06; H04W 76/02; H04W 76/14; H04W 4/80; H04W 76/20
USPC .................................................. 370/328, 329
See application file for complete search history.

(56) References Cited

U.S. PATENT DOCUMENTS

| | | | |
|---|---|---|---|
| 2012/0188876 A1* | 7/2012 | Chow ................... | H04W 48/08 370/237 |
| 2014/0005859 A1 | 1/2014 | Baskin et al. | |
| 2014/0133662 A1* | 5/2014 | Boll ....................... | H04R 29/00 381/56 |
| 2014/0136658 A1* | 5/2014 | Wahler ............... | H04B 7/18508 709/218 |
| 2014/0200740 A1 | 7/2014 | Lavi et al. | |

(Continued)

FOREIGN PATENT DOCUMENTS

WO    WO-2015019234 A1 *   2/2015   ........... H04W 36/14

*Primary Examiner* — Rownak Islam
(74) *Attorney, Agent, or Firm* — Michael Spenner; Brooks Kushman P.C.

(57) ABSTRACT

A system includes a processor configured to determine available vehicular connectivity options in response to a data transfer request. The processor is further configured to determine a preferred option from the available connectivity options based on previously stored connectivity policies, if multiple connectivity options exist which can be utilized to fulfill the request, and utilize the preferred option to fulfill the request.

12 Claims, 5 Drawing Sheets

(56) References Cited

U.S. PATENT DOCUMENTS

| | | | |
|---|---|---|---|
| 2014/0207465 A1* | 7/2014 | Elliott | G10L 15/00 704/275 |
| 2014/0343753 A1 | 11/2014 | Kirsh | |
| 2015/0045984 A1* | 2/2015 | Hui | B60R 16/02 701/1 |
| 2016/0044519 A1* | 2/2016 | Bai | H04W 48/18 370/252 |

* cited by examiner

METHOD AND APPARATUS FOR DISTRIBUTED CONNECTIVITY VEHICLE MANAGEMENT

TECHNICAL FIELD

The illustrative embodiments generally relate to a method and apparatus for distributed connectivity vehicle management.

BACKGROUND

Vehicular computing systems interface with a variety of remote systems including, for example, mobile devices, the cloud, remote servers, routers, etc. Further, these computing systems can utilize multiple vehicle connectivity systems to establish connections to these external sources. For example, if one considers FORD MOTOR COMPANY'S C-MAX HYBRID ELECTRICAL VEHICLE, it comes equipped with two connectivity modules, a telematics control unit and the SYNC system.

While both of these modules serve different customer needs, they also provide overlapping physical connectivity options to the cloud/backend servers. SYNC, for example, supports BLUETOOTH (BT) with different profiles. One of the profiles is SPP (serial port profile) that can be utilized for transferring data between SYNC and a BT paired phone. FORD's SMART DEVICE LINK (SDL) utilizes this profile and enables interfaces for smartphone applications such as PANDORA, NPR (NATIONAL PUBLIC RADIO), etc. to safely interact with these applications using vehicle human machine interface (HMI) resources. SYNC is also equipped with Wi-Fi, which helps SYNC to connect to a Wi-Fi access point for internet connectivity.

The telematics control unit (TCU), offers connectivity to the internet for the vehicle using the cellular 3G/4G LTE. The TCU also has a Wi-Fi chip that can be utilized for connecting to a Wi-Fi access point in client mode. Thus, there are multiple options to connect such a system to the internet, using, for example, either the TCU or the SYNC system. One system may be more desirable than another, however, depending on what the purpose of the connection is or what other conditions are present. Other one-way data sources (HD Radio, DAB, SIRIUS, XM Radio, etc.) and two-way data sources (mobile device applications, USB drives, etc.) also exist.

SUMMARY

In a first illustrative embodiment, a system includes a processor configured to determine available vehicular connectivity options in response to a data transfer request. The processor is further configured to determine a preferred option from the available connectivity options based on previously stored connectivity policies, if multiple connectivity options exist which can be utilized to fulfill the request, and utilize the preferred option to fulfill the request.

In a second illustrative embodiment, a computer implemented method includes determining available connectivity options in response to a data transfer request. The method also includes limiting the available options based on policies associated with data to be transferred by the request. The method further includes limiting the available options based on policies associated with a vehicle, selecting an option from the available options limited by the policies and utilizing the selected option to fulfill the data transfer request.

In a third illustrative embodiment, a system includes a processor configured to determine available vehicular connectivity options in response to a data transfer request. The processor is also configured to limit a list of options based on connectivity policies associated with data to be transferred by the request, if multiple connectivity options exist. The processor is additionally configured to further limit the list of options based on connectivity policies associated with a vehicle, if limited list still has multiple options. The process is also configured to select an option based on a pre-set ordering of policies defining a general preference for certain options over others if all constraints are met, if the further limited list still has multiple options, and utilize the select option or the only remaining option to fulfill the data transfer request.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
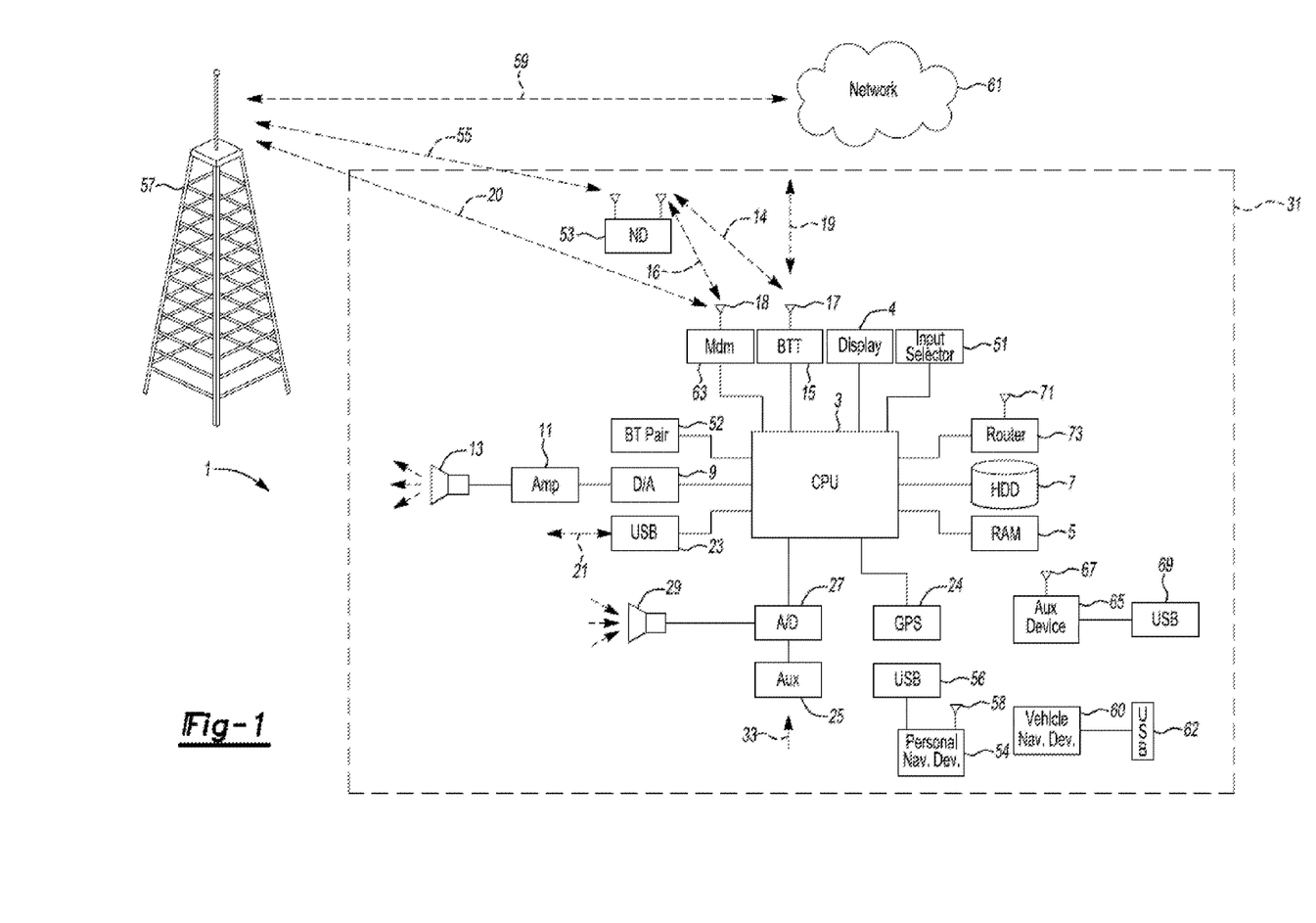
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

When there are multiple opportunities and options for connectivity, the problem becomes how to choose the right channel (assuming there is a preferable option). In one example demonstrating an illustrative choice, a user may want to configure the connectivity channels in such a way that the vehicle data for analytics is transported only when a TCU is connected to a particular Wi-Fi access point. The proposed illustrative embodiments set out methods and apparatuses for exemplary distributed vehicle connectivity managers (DVCM).

The DVCMs are proposed solutions for connecting to a connectivity resource when there are multiple options for connectivity. The solution utilizes applications having sessions and each session has a policy. The policy defines services. For example, when both a vehicle computing system (like FORD's SYNC system) and a TCU are present, the following services may be available: SYNC Wi-Fi, SYNC BLUETOOTH, TCU WiFi and TCU Cellular.

SYNC can receive meta-data information (traffic, weather, etc.) from other sources such as HD Radio, DAB, XM Radio, SIRIUS, etc. If an application running on SYNC wants to send or receive any data, and if the policy calls for using TCU Wi-Fi or TCU cellular, the connectivity manager running on SYNC may communicate with the SYNC Service Application, which will utilize the Connectivity Manager running on the TCU to send/receive the data. More on this strategy and implementation system will be shown with respect to FIG. 3.

Figure 2A:
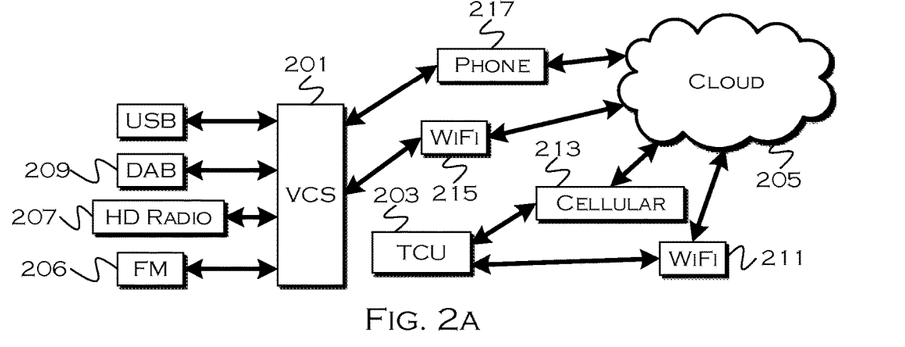
FIGS. 2A-2C show illustrative systems providing varied connectivity options.
Figure 2B:
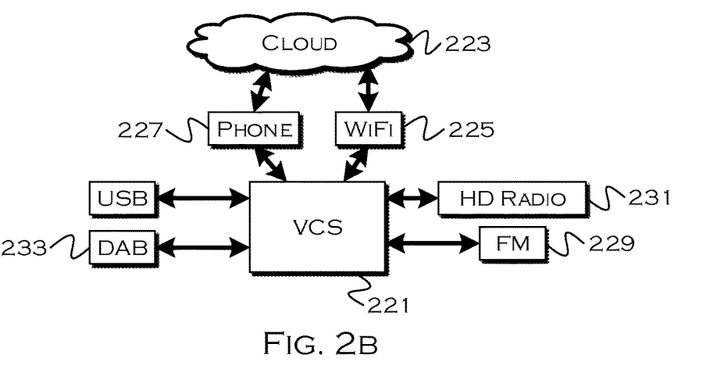
Figure 2C:
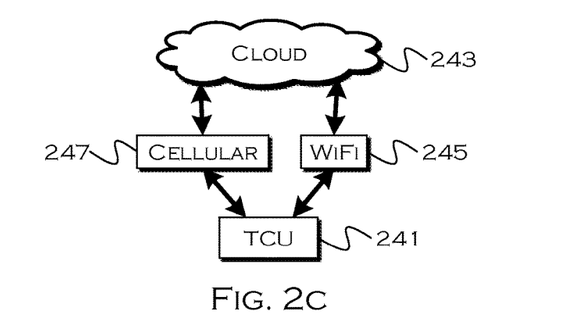

FIGS. 2A-2C show illustrative systems providing varied connectivity options. These are illustrative examples of the SYNC system representing a vehicle computing system, the TCU system representing a telematics control system and a combination of both, as well as exemplary connectivity options that are available to both systems and when both systems are present.

In the first example, shown in FIG. 2A, the connectivity options include those provided by both the vehicle computing system (SYNC) 201 and the TCU 203. In this system, SYNC has a number of external connectivity options, providing both one-way and two-way data connections.

The one-way connections include, for example a DAB connection 209, and HD Radio connection 207 and an FM connection 205. These connections can be used to receive data, but, since they are uni-directional, they are reliant on the exterior system "deciding" to provide the particular data (e.g., the system cannot request certain data from any of these sources, unless a backend connection, such as through the internet or a server, is provided by which the system can communicate with one of these sources).

Two-way connections are also provided to SYNC, including, for example, utilizing a user mobile device 217 to connect to the cloud 205 (using the device's Wi-Fi or cellular service). The system also has a Wi-Fi connection 215, which can use, for example, a wireless access point to connect to the cloud. A USB drive can also be connected to SYNC, to provide a local two-way connection with the drive.

In addition to SYNC, the TCU has multiple connectivity options for connecting to the cloud, and these may be very similar to the SYNC connections (e.g., there isn't a clear preference based solely on a connection type). Here, the TCU also has a Wi-Fi connection option 211, such as through an access point that might even be the same access point that SYNC would access. Also, a cellular modem might be included with the TCU, providing a cellular connection option 213 to the cloud.

Each of the systems shown in FIGS. 2B and 2C are simply alternative configurations where only one of the two connectivity systems exists, making it easier to select a particular connectivity option given the limited choices.

For example, a vehicle may only be provided with the SYNC system 221 or a similar vehicle computing system as shown in FIG. 2B. Such a system would still have the external one-way communication options, such as the DAB 233, the HD radio 231 and the FM radio 229. The local USB drive option also exists, as well as the other two-way communication options. These include the cellular connection through a user's mobile device 227 and a Wi-Fi connection 225 to the cloud 223 through a wireless access point, for example.

FIG. 2C shows the connectivity options when a system only has access to a telematics control unit (TCU) 241. The TCU lacks the one-way communication options in this example, but is still provided with a cellular modem providing a cellular connection option 247 tp the cloud 243. The system also includes a Wi-Fi connectivity option 245 that provides a wireless connection through, for example, a wireless access point. In these systems, there are fewer connectivity options, but there still exist multiple options for connecting to the cloud. Thus, even when there is only a single system, there is a use for a distributed connectivity manager.

Figure 3:
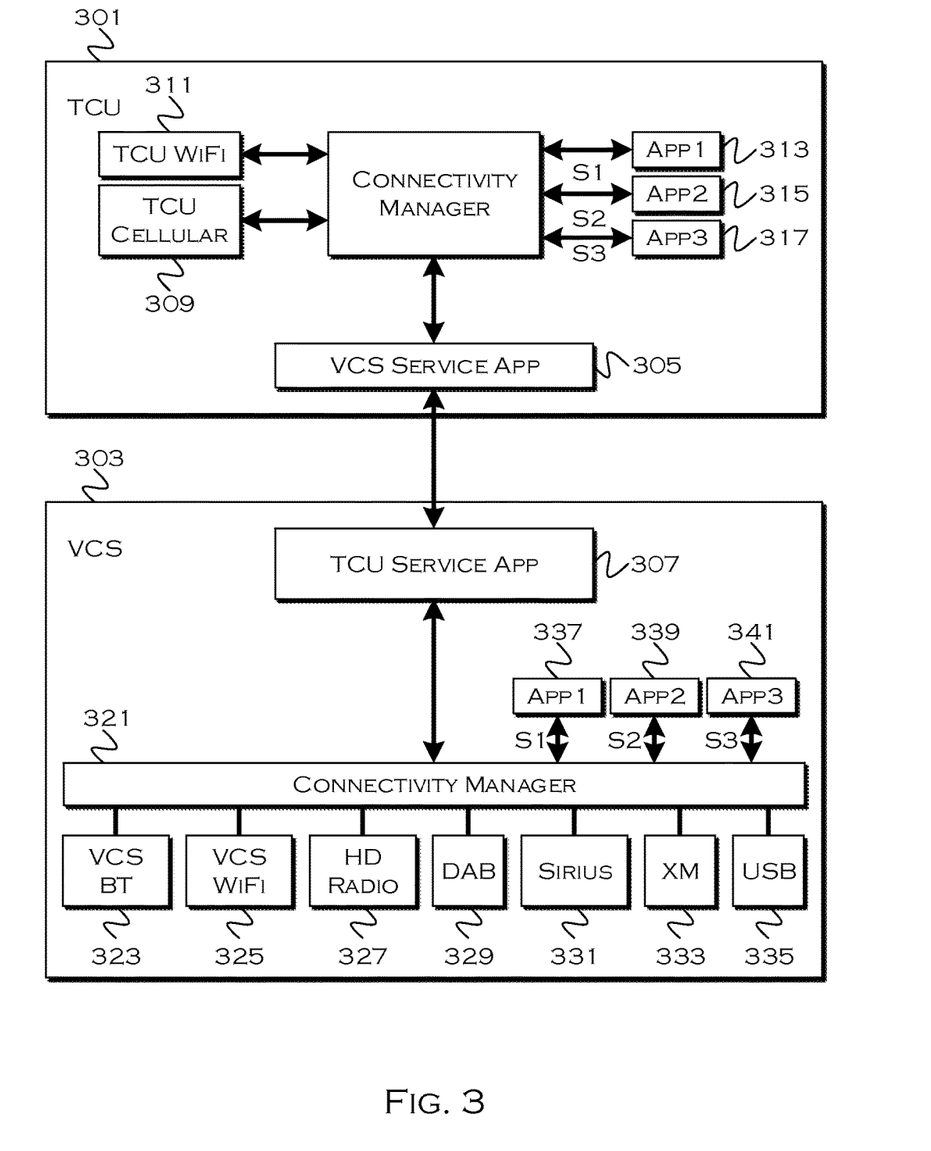
FIG. 3 shows an illustrative distributed vehicle connectivity manager system.

FIG. 3 shows an illustrative distributed vehicle connectivity manager system. In this example, each of the connectivity systems is shown with a connectivity manager running thereon. Policies assigned to applications sessions (which may need to utilize connectivity options) define which services are available for the sessions and can also serve to define when a particular service is utilized.

For example, the TCU computing system 301 may have multiple applications 313, 315, 317 executing thereon or communicating therewith, and each of these applications will have the connectivity services utilized thereby defined through a connection to the connectivity manager 302. A SYNC service application 305, is provided that can communicate with a corresponding TCU service application 307 on the SYNC system 335. Thus, if the connectivity manager of the TCU needs to utilize a SYNC connectivity option (and/or to be aware of the available SYNC connectivity options), the system can communicate with the SYNC connectivity manager through the service application.

The connectivity manager 302 is aware of the local connectivity options of the system on which it resides, and can implement policies to control access to and route usage of these services. For example, the access to the TCU Wi-Fi 311 and the TCU cellular connection 309 are controlled through the TCU connectivity manager.

An example of a session for an application may look something like Policy: <User_ID=user1; Connection_Type=WiFi, Cellular; Roaming_Policy=Forbidden>; Routing: Each session maintains a policy routing table and it contains a default route to the selected service. So, for the preceding policy, if the system is in a roaming mode (e.g., no non-roaming cellular network is available), no access to a vehicle modem in roaming mode (or, for example, a user mobile device in roaming mode) will be available.

Paralleling the TCU, the SYNC system 303 has a TCU service application 307 that communicates with the SYNC service application to make the SYNC system aware of and provide access to the TCU connectivity options. Each of the applications running on or communicating with SYNC 337, 339, 341 have access to the connectivity options through the DVCM 321. Here, the connectivity options are the two-way USB 335, WiFi 323 and BLUETOOTH 325 (which provides a mobile device cellular connection to the cloud). The one-way options are the HD Radio 327, the DAB 329, and SIRIUS 331 and XM 333 radio.

Figure 4:
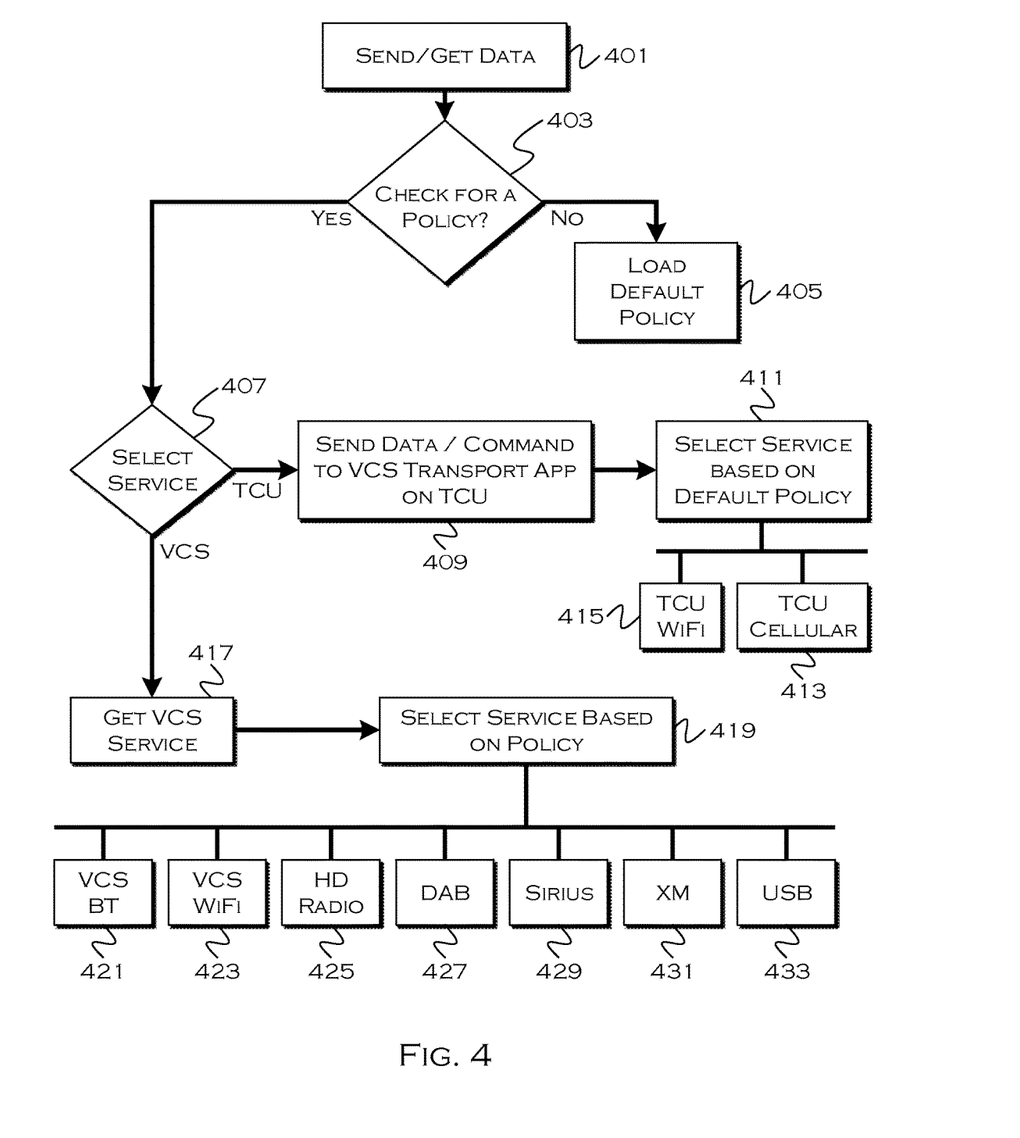
FIG. 4 shows an illustrative process for obtaining or sending data.

FIG. 4 shows an illustrative process for obtaining or sending data. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, an application issues a send data or get data request 401, requiring some connection (even if one-way) to an external source to obtain the data or to which to send the data. For each request, the process checks to see if there is a policy that exists for the application that should control which connectivity option is used to send or receive the data 403. If no policy already exists, a default policy is loaded for the application and utilized for that application (or at least for that particular request) 405.

Once either a policy has been discovered or the default policy has been loaded, the process uses the policy to determine which of the connectivity systems (in this example SYNC and TCU) will be utilized to handle the data request 407. In this example, the application is running on or interfacing with the SYNC system, so if the TCU connectivity is selected, the process will send the data or the data retrieval command to the SYNC transport application running on the TCU 409. Once the command and/or data is resident on the TCU system, the DVCM on the TCU will select a service based on a default TCU policy (since, in this example, the application session is running on the SYNC side, a default TCU policy will be used 411, since any policy assigned to the session is a SYNC policy and doesn't accommodate the TCU connectivity in this example). Using the TCU default policy, either the TCU WiFi 415 or TCU cellular connection 413 is used to send or request the data.

If the SYNC service is selected to handle the connectivity for the request, then the policy will dictate which service will be used for connectivity based on the current context and available connectivity options 417. Based on the policy, a particular connectivity service is selected 419, which, in this example, is a wide variety. The possibilities encompass a WiFi 421, BLUETOOTH 423, HD Radio (for data retrieval requests) 425, DAB (also for data retrieval) 427, SIRIUS 429 and XM radio 431 (one way, for retrieval) and/or USB 433.

Figure 5:
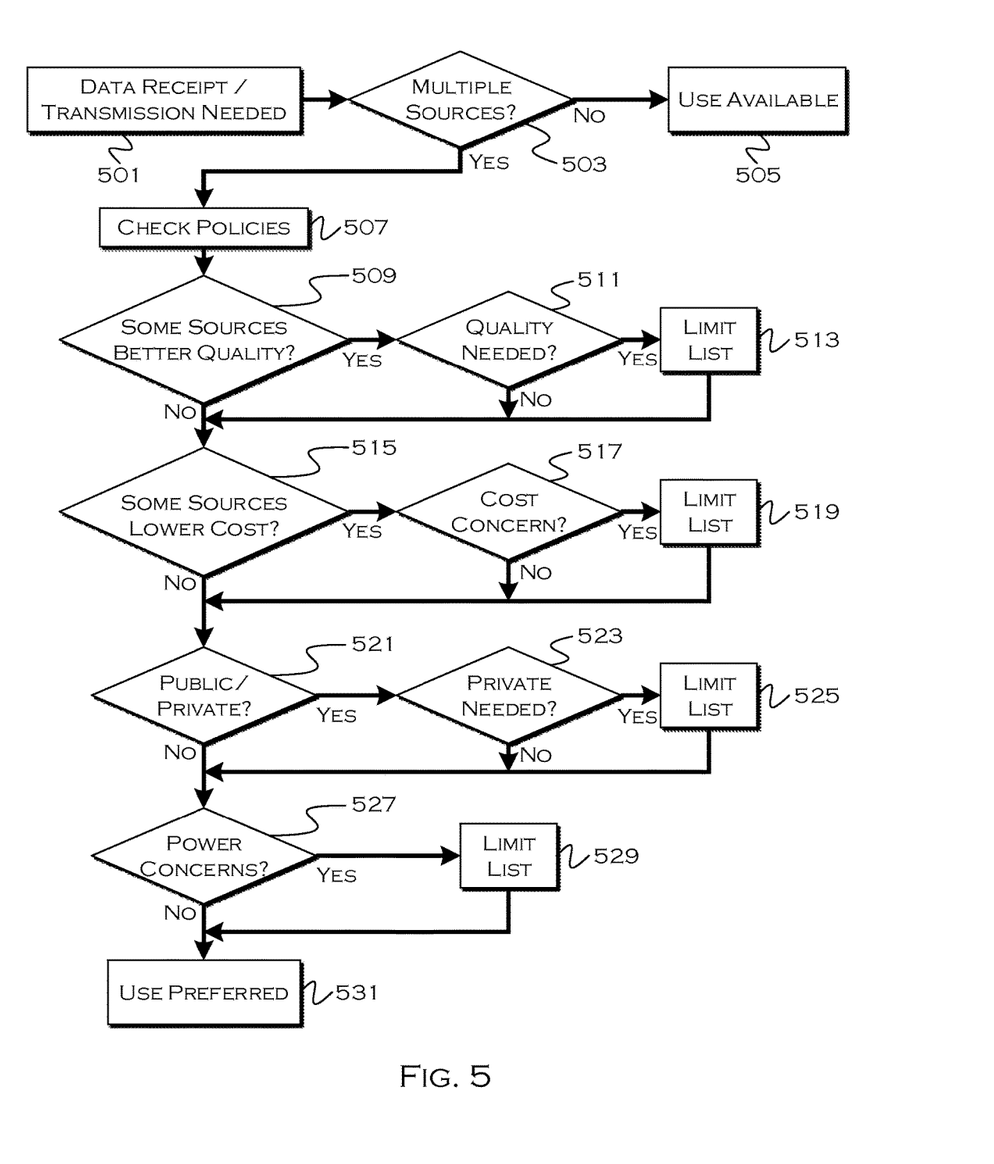
FIG. 5 shows an illustrative example of connectivity management.

FIG. 5 shows an illustrative example of connectivity management. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a vehicle system requests data or needs to transmit data 501 to a remote entity. It is possible that multiple sources could be available to fulfill a request (e.g., without limitation, HD radio for traffic or a traffic server), but one of the sources may provide a higher quality of data than another, for example (the traffic server in the preceding example provides better, real time traffic data). On the other hand, only an expensive connection may be available to receive the data from the better source, whereas the HD radio, in the previous example, would be a free connection. Balancing a set of constraints is one illustrative task of the connectivity manager, based on which connections are available to begin with.

In this process, the connectivity manager process determines if there are multiple sources (connectivity options) to fulfill the request 503. If there is only one possible connectivity option at the time, that option is used 505 (although even this could be subject to constraints, for example, if the option was too expensive, no transmission/receipt would occur, or if the option was a public network, and private data was being transmitted, no transmission/receipt would occur).

If there are multiple connectivity options, the process will check the policies associated with each connectivity option 507. These policies may also have some relationship to the type of data being requested/sent, and can vary from vehicle to vehicle and even from driver to driver.

In no particular order, some exemplary policy checks are shown, to illustrate, but not to limit, the types of decisions the connectivity manager can make. Here, the process first checks to see if some of the available options are of better quality than other options 509. If there are higher quality (e.g., more reliable with higher signal strength, faster with higher bandwidth, etc.) options, the process then determines if quality is a concern for the requested type of transmission (e.g., is there a quality requirement or policy dictating a certain quality is needed or would be preferred) 511. If there is a quality constraint, the list of available options is limited to those meeting the constraint 513. Otherwise, the process continues with the full list of options.

Next, the process checks to see if there are lower cost sources 515. For example, without limitation, if data comes at a cost premium, and traffic data is requested, but is not "needed" (i.e., the highest quality real-time data is not needed), a free HD radio source for traffic may be preferable to using a wireless data-plan that may have some cost. If there are any lower cost sources (from the full list or the previously limited list), the process then checks to see if cost is of concern for the upcoming transmission/receipt 517. If cost is a constraint, the list is limited again (or initially) to those options that meet the cost constraints 519.

Next, the process checks to see if any of the transmission/receipt options are public or private options 521. If there are private networks available 521, the process determines if privacy of data is a concern for the upcoming request 523. For example, financial data may require a private network, but traffic data can be requested over a public network. If a private network is needed, the process then further limits the list to those networks that are not open to the public 525.

Finally, the process may determine if power is of a concern 527. Different transmission options may have different power requirements associated therewith, and in a low-power situation, the use of a low-power option may be desired. This may be situational, so in this instance the process may simply check a power state of the vehicle, and then if power is of a concern, limit the list to those options requiring power below an acceptable threshold 529.

Finally, out of any options remaining, a preferred source is used 531. Since there may be only a few options remaining, this will select the preferred option of those remaining. All possible options ever encountered by the connectivity manager may have some standard ranking (e.g., if A, B and C are present, use B before C before A). This generalized ranking can be used to select a preferred option from those meeting the constraints already imposed on the list of remaining options. Drivers may have specific policies that they prefer, and the vehicle can identify a driver and load a policy set associated with the driver. If a driver is unidentifiable or has no policy set, a pre-set list of policies and ordering of options (such as an OEM defined list) can be utilized in place of a driver-preferred list.

In other examples, the process for connectivity selection can be much simpler as well. Policies can define, for example, that a certain request uses option A, or B if no A is available, or no transmission if A and B are not available. Any number of methodologies for handling the presence of multiple connectivity options may be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
determine available vehicular connectivity options in response to a data transfer request;
determine a preferred option from the available vehicular connectivity options based on previously stored connectivity policies defined and saved with respect to the vehicular connectivity options, defining at least data types to be serviced with a given option, responsive to determining that multiple available vehicular connectivity options exist, wherein the connectivity policies associated with a vehicle are determined on a driver-by-driver basis, a driver identifiable by a vehicle computing system, and wherein if the driver is not identified, a generic pre-set list of policies associated with the vehicle is used; and
utilize the preferred option to fulfill the data transfer request.

2. The system of claim 1, wherein the connectivity policies include public/private network utilization policies.

3. The system of claim 1, wherein the connectivity policies include power-utilization policies.

4. The system of claim 1, wherein the connectivity policies include a general ordering of connectivity options, to be used when multiple options remain after any other policy constraints are met.

5. A computer implemented method comprising:
determining available connectivity options in response to a data transfer request;
limiting the available connectivity options based on policies associated with data to be transferred by the data transfer request;
limiting the available connectivity options based on the policies defined and saved with respect to the connectivity options, defining at least data types to be serviced with a given option, responsive to determining that multiple available connectivity options exist, wherein the policies associated with a vehicle are determined on a driver-by-driver basis, a driver identifiable by a vehicle computing system, and wherein if the driver is not identified, a generic pre-set list of policies associated with the vehicle is used;
selecting an option from the available connectivity options limited by the policies; and
utilizing the selected connectivity option to fulfill the data transfer request.

6. The method of claim 5, wherein the policies associated with data include public/private network utilization policies.

7. The method of claim 5, wherein the policies associated with the vehicle include quality-of-connection policies.

8. The method of claim 7, wherein the quality-of-connection policies includes-bandwidth of the available connectivity options.

9. The method of claim 7, wherein the quality-of-connection policies includes-signal strength.

10. The method of claim 5, wherein the policies associated with the vehicle include power-utilization policies.

11. The method of claim 5, wherein the selecting further includes selecting based on a stored general order of the connectivity options, ordering the available connectivity options when other policy constraints are met.

12. A system comprising:
a processor configured to:
determine available vehicular connectivity options in response to a data transfer request;
if multiple vehicular connectivity options exist, limit a list of options based on connectivity policies associated with data to be transferred by the data transfer request;
if the limited list has multiple options, further limit the list of options based on the connectivity policies associated with a vehicle, defined and saved with respect to the vehicular connectivity options, defining at least data types to be serviced with a given option, responsive to determining that multiple available connectivity options exist, wherein the connectivity policies associated with the vehicle are determined on a driver-by-driver basis, a driver identifiable by a vehicle computing system, and wherein if the driver is not identified, a pre-set list of policies associated with the vehicle is used;

if the further limited list has multiple options, select an option based on a pre-set ordering of policies defining a general preference for certain options over others if all constraints are met; and utilize the selected option or an only remaining option to fulfill the data transfer request.

\* \* \* \* \*